US006879832B1

(12) United States Patent
Palm et al.

(10) Patent No.: US 6,879,832 B1
(45) Date of Patent: Apr. 12, 2005

(54) METHOD AND APPARATUS FOR TRANSFERRING INFORMATION BETWEEN MOBILE TERMINALS AND ENTITIES IN A RADIO ACCESS NETWORK

(75) Inventors: Lars Håkan Palm, Lund (SE); Göran Rune, Linköping (SE); Bo S. P. Wallentin, Ljungsbro (SE); Per H. A. Willars, Stockholm (SE); Par Beming, Stockholm (SE); Walter Muller, Upplands Väsby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/258,151

(22) Filed: Feb. 26, 1999

(51) Int. Cl.[7] .............................. H04Q 7/20; H04Q 7/00
(52) U.S. Cl. .................... 455/445; 455/432.1; 455/436; 455/435.1; 370/331; 370/328
(58) Field of Search ........................... 455/426.1, 432.1, 455/433, 436, 435.1, 445; 370/338, 349, 328, 331

(56) References Cited

U.S. PATENT DOCUMENTS

| | | | | |
|---|---|---|---|---|
| 6,104,929 A | * | 8/2000 | Josse et al. ................. | 455/445 |
| 6,212,379 B1 | * | 4/2001 | Monrad et al. .......... | 455/435.1 |
| 6,233,458 B1 | * | 5/2001 | Haumont et al. ........... | 455/445 |
| 6,292,667 B1 | | 9/2001 | Wallentin .................... | 455/458 |
| 6,438,370 B1 | * | 8/2002 | Einola et al. ............ | 455/422.1 |
| 6,463,055 B1 | * | 10/2002 | Lupien et al. .............. | 370/353 |
| 6,505,044 B1 | * | 1/2003 | Back et al. ................. | 455/445 |
| 6,512,756 B1 | * | 1/2003 | Mustajarvi et al. ......... | 370/341 |

FOREIGN PATENT DOCUMENTS

| | | |
|---|---|---|
| WO | 95/28063 A | 10/1995 |
| WO | 97/21313 A | 6/1997 |
| WO | 98/32304 A | 7/1998 |
| WO | 98/32305 A | 7/1998 |

OTHER PUBLICATIONS

*IEEE Communications Magazine*, vol. 36, No. 2, Feb. 1, 1998, pp. 82–95, XP000740416, E. Berruto, "Research Activities on UMTS Radio Interface, Network Architectures, and Planning".

* cited by examiner

*Primary Examiner*—Lee Nguyen
*Assistant Examiner*—Raymond B. Persino
(74) *Attorney, Agent, or Firm*—Nixon & Vanderhye P.C.

(57) ABSTRACT

In the context of a radio communications system that includes a core network coupled to a radio access network (RAN) and a plurality of mobile terminals, a connection may be established between the core network and one of the plurality of mobile terminals through the radio access network. A temporary RAN identifier is associated with the mobile terminal for the established connection. The temporary RAN identifier is used to assist in the transfer of information pertaining to the established connection or to the establishment of that connection through the radio access network. The radio access network includes a first RAN node associated with a first geographical coverage area and a second RAN node associated with a second geographical coverage area. When the mobile terminal moves from the first coverage area to the second coverage area, the connection is re-established through the RAN by way of the first and second RAN nodes using the temporary RAN identifier. The temporary RAN identifier in packets corresponding to the established connection is used to direct those packets to and from the first and second RAN nodes. The first and second RAN nodes analyze packets corresponding to the established connection including the temporary RAN identifier included in each packet. From analysis of the temporary RAN identifier, the first and second RAN nodes determine where packets are to be routed. The temporary RAN identifier is also advantageously employed to facilitate mobile terminal registration and paging operations.

52 Claims, 9 Drawing Sheets

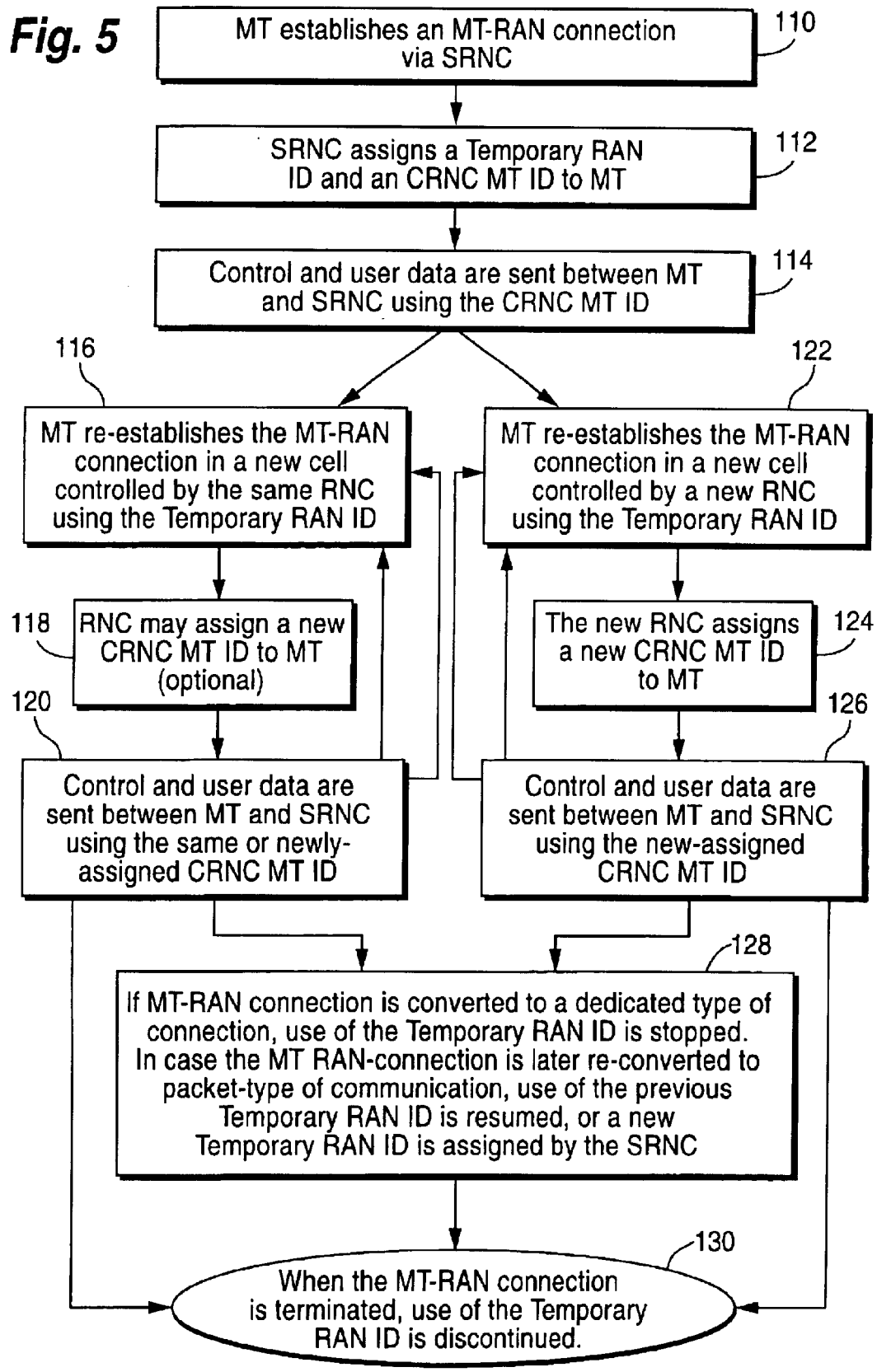

METHOD AND APPARATUS FOR TRANSFERRING INFORMATION BETWEEN MOBILE TERMINALS AND ENTITIES IN A RADIO ACCESS NETWORK

RELATED APPLICATIONS

This patent application is related to commonly-assigned U.S. patent application Ser. No. 09/071,886, filed May 5, 1998, now U.S. Pat. No. 6,292,667, and entitled "Multicell Area Paging For Cellular Telecommunications System," which is incorporated herein by reference.

FIELD OF THE INVENTION

The present invention finds application to cellular telecommunications and relates to the transfer of information in a radio access network.

BACKGROUND OF THE INVENTION

A cellular telephone is one example of what is generally characterized as a "mobile station" (MS), a "mobile terminal" (MT), or even more generally as "user equipment" (UE). The term mobile terminal is employed hereafter for purposes of description. Telecommunications services are provided between a cellular telecommunications network and a mobile terminal over an air interface, e.g., over radio frequencies. An active mobile terminal communicates over the air interface with one or more base stations. The base stations are managed by base station controllers (BSCs), which in some systems, are known as radio network controllers (RNCs). The term RNC is employed hereafter for purposes of description. Radio network controllers are coupled to one or more telecommunications networks by way of one or more control nodes such as a mobile switching center (MSC) node for connecting to connection-oriented, circuit-switched networks such as PSTN and/or ISDN, and a general packet radio service (e.g., GPRS) node for connecting to connectionless, packet-switched networks such as the Internet.

A basic cellular communications system 10 is shown in simplified function block format in FIG. 1. An example core network 12 is connected to several radio network controllers 14 including RNC1, RNC2, and RNC3. Each RNC 14 controls the allocation of radio resources and radio connectivity operations for a set of cells: RNC1 controls cells 1:1–1:5, RNC2 controls cells 2:1–2:5, and RNC3 controls cells 3:1–3:5. The RNCs communicate by way of a signaling network, e.g., signaling system number 7 (SS7), and a transport network generally indicated at 16. Each cell is a geographical area where radio coverage is provided by radio base station equipment at the base station site. A base station may serve one or more cells. A handover occurs as a mobile terminal travels from an old cell to a new cell. This permits mobile terminals to "roam" considerable distances. Each cell is identified using a unique identity broadcast in that cell over a common broadcast channel.

As indicated in FIG. 1, the RNCs 14, the interconnecting signaling and transport network 16, and the radio base station equipment in each of the cells together comprise a radio access network (RAN) 20. Mobile terminals (MTs) 18 permit a subscriber access to telecommunications services offered by the core network 12 via the RAN 20. The radio access network 20 is responsible for the radio transmission and control of radio connections between the core network 12 and the mobile terminals 18.

In the present invention, different roles are assigned to RNCs in the RAN depending on circumstances, configurations, etc. One RNC role is that of a "controlling" RNC (CRNC) which controls the radio resources in its set of cells. In the example shown in FIG. 1, the RNC1 is the controlling RNC for cells 1:1 to 1:5, the RNC2 is the controlling RNC for cells 2:1 to 2:5, and the RNC3 is the controlling RNC for cells 3:1 to 3:5.

FIG. 2 shows adjacent cells in a cellular communications network. An active cell denotes the cell currently supporting a radio connection with a mobile terminal. Adjacent neighboring cells may be selected by the mobile terminal via forward handover to support the connection. Forward handover is a process where a mobile terminal itself continues an established connection between a core network and the mobile terminal as the mobile terminal moves between different cells in the radio access network. Contrasted with traditional handover, the mobile terminal in forward handover independently re-establishes the radio connection with a new cell. This re-establishment of the connection is performed without prior notification via the old cell. Nor is there advance preparation in the network to continue the communication via the new cell. It is the mobile terminal that initiates and orchestrates forward handover rather than the core network, the core network node (e.g., MSC), or the radio access network (RAN).

When the mobile terminal moves between cells controlled by different RNCs and performs forward handover, other roles are assigned to one or more of the RNCs for purposes of a connection between the core network and the mobile terminal. The RNC that controls the cell where the connection to the mobile terminal is initially established is assigned a "serving" RNC role for the duration of the connection. As the mobile terminal moves to new cells, the mobile terminal may reestablish the connection via a new cell controlled by another RNC which is then labeled as a "drift" RNC. For the connection to MT1, the controlling RNC of cell 1:2 (i.e., RNC1) acts as the serving RNC. For the connection to MT3, the controlling RNC of cell 2:5 (i.e., RNC2) acts as the drift RNC. The serving RNC role may be re-allocated to another RNC during the connection. The present invention may also be applied to such re-allocations.

A serving RNC (SRNC) has supervisory control of the mobile terminal connection within the radio access network 20 and provides a single interface to the core network 12 for that mobile terminal connection. The role of the drift RNC is to support the serving RNC with radio resources for the mobile terminal connection in cells controlled by the drift RNC. In the example shown in FIG. 2, RNC1 acts as the serving RNC for the connections between the core network and mobile terminals MT1, MT2, and MT3. After forward handovers, the connection to mobile terminal 3 (MT3) now includes a cell 2:5 that is controlled by RNC2. Thus, RNC2 functions as a drift RNC for this particular connection.

Referring again to FIG. 1, mobile terminal MT2 is in contact with the RAN 20 via cell 1:5 having neighbor cells 1:4 and 2:1. As a result of changed radio conditions detected from neighboring cell information, MT2 decides that the radio communication is to be reestablished via neighbor cell 2:1 controlled by RNC2 rather than RNC1. Accordingly, signaling and data transport between RNC1 and RNC2 are required to reestablish the radio connection. RNC1 acts as the serving RNC, and RNC2 acts as the drift RNC for MT2's connection. Furthermore, mobile terminal MT3 is in contact with the RAN 20 via cell 2:5 having neighbor cells 2:4 and cell 3:1. Because of changed radio conditions detected from neighboring cell information, MT3 decides that the radio communication is to be re-established via cell 3:1 controlled by RNC3. RNC1 acts as the serving RNC, and RNC3 acts as the drift RNC for the MT3 connection.

In both of these scenarios, signaling and data transport between serving RNC and drift RNC are required to reestablish the radio connection. Once a mobile terminal decides to perform the forward handover, it sends a cell update request message to the drift RNC, and the drift RNC sends a cell update message to the serving RNC. The serving RNC then returns a cell update accepted message to the drift RNC which passes that message back to the mobile terminal through the appropriate cell.

Since forward handover may involve more than one RNC, what is needed is an efficient way to route control messages and user data from the MT via the RAN 20 to the core network 12 and vice versa. This requires an efficient mechanism to route the control and user data between the RNCs in the RAN. Such efficient communications between RAN nodes or entities are advantageous in other scenarios.

One example scenario is found in the context of mobility management, i.e., messages related to paging and keeping track of the current location of the mobile terminal. In packet-switched communication services, radio resources are typically shared by plural mobile terminals and used only when either (1) the mobile terminal desires to transmit or (2) the network transmits to the mobile terminal. When a mobile terminal is connected with the network during a connection involving a packet-switched service, cell updating and registration area updating are employed for mobility management. After an active mobile terminal enters the coverage area of another cell, the mobile terminal re-establishes the radio connection with the new cell by means of a cell update procedure ("cell connected state").

However, in idle periods of no data transfer, cell updating wastes radio resources, so registration area (RA) updating is used. In RA updating, the idle mobile terminal is in what is referred to hereafter as a "registration area connected state." A registration area corresponds to a group of cells. Since traffic for a packet switched service is "bursty" in nature with long periods of no packet transfer, radio resources would be wasted if a radio channel was continuously assigned to a connection. Therefore, when the mobile terminal in an "RA connected state" moves into a new registration area, the mobile terminal updates the network with its current registration area using a registration area update procedure similar to the cell update procedure. Thereafter, the mobile terminal may move freely between cells belonging to the same RA without having to perform an update procedure. If a packet is to be sent from the network to the mobile terminal and the location of the mobile terminal is known only at the registration area level (rather than at a cell level), a paging message is broadcast in all cells belonging to the registration area where the mobile terminal made its last registration area update. When the mobile terminal answers the page from the particular cell where it is currently located, the mobile terminal enters the "cell connect state." Both cell update related messages and registration area update related messages may often require message routing between RNCs in the RAN.

FIG. 3 illustrates an example where cells controlled by RNC1–RNC3 are grouped into registration areas, RA1–RA6, each consisting of one or several cells. Information transmitted on the broadcast channel in each cell may contain cell and registration area identifiers for purposes of registration control. As long as such cell and registration area identifiers broadcast by a specific cell contain the same cell and registration area identifiers assigned to the mobile terminal during the most recent cell or RA update procedure, the mobile terminal need not register. However, when the terminal mobile terminal does not recognize the broadcast cell and registration area identifiers in the cell, it initiates an RA update procedure.

An individual registration area (IRA) for a mobile terminal may be defined consisting of one or more registration areas (identified by RA identity) and/or one or several cells (identified by cell identity). Thus, a mobile terminal assigned the IRA of RA4, RA5, and cell 3:4 in FIG. 3, need not perform a new registration until entering cell 2:2 or 3:5. When there is information to be sent to a mobile terminal and the serving RNC must locate the mobile terminal on a cell level, the serving RNC initiates a paging procedure so that a paging message is sent in all cells belonging to the IRA. If the cells of the IRA belong to more than one RNC, the serving RNC sends paging request messages directly to each RNC that has a cell in the IRA. Alternatively, the serving RNC may send a paging request message to each RNC controlling the registration area(s) of the IRA, and to the RNCs controlling the additional cells of the IRA. The RNCs controlling the different registration area(s) will in turn request paging from other RNCs controlling cells within the registration areas. The mobile terminal response to the page may be received in a cell controlled by another RNC than the serving RNC, and possibly, by an RNC other than the RNC that acted as the drift RNC at the latest RA registration.

Accordingly, forward handover and mobile terminal location/mobility management operations require considerable signaling and data transport in the radio access network 20 between RAN entities like RNCs. The RAN also must keep track of which RNC controls the cell or registration area where the MT is currently known. It would therefore be desirable to have an efficient means to facilitate communication/information transfer between RNCs in the RAN that is transparent outside of the radio access network.

It is an object of the present invention to provide effective and efficient communication between mobile terminals and entities/nodes in the radio access network (e.g., RNCs).

It is an object of the present invention to provide and facilitate addressing of individual nodes in the RAN without each node having to know in advance the addresses of all other nodes.

It is another object of the present invention to provide and facilitate addressing nodes in the RAN without a location register common to the RAN where information related to a connection with a specific mobile terminal: is stored, e.g., an identity of current cell or registration area, a current serving RNC address, a current drift RNC address, a current temporary mobile terminal RAN identifier, etc.

It is an object of the present invention to provide and facilitate efficient radio connection re-establishment in a new cell belonging to another RNC than the RNC where the radio connection was originally established.

It is an object of the present invention to provide and facilitate efficient routing of control and user data after radio connection reestablishment in a new cell belonging to another RNC than the RNC where the radio connection was originally established.

It is an object of the present invention to provide and facilitate efficient routing of control and user data relating to paging and other mobility management messages.

In the context of a cellular communications system that includes a core network coupled to a radio access network (RAN) and a plurality of mobile terminals, a connection may be established between the core network and one of the plurality of mobile terminals through the radio access network. A temporary RAN identifier is associated with the mobile terminal for the established connection. The temporary RAN identifier is used to assist in the transfer of information pertaining to the established connection or to the establishment of that connection through the radio access network. The temporary RAN identifier is included in each data packet associated with the connection, and those connection data packets are routed through the RAN using the temporary RAN identifier incorporated in each connection packet.

The radio access network includes a first RAN node associated with a first geographical coverage area and a second RAN node associated with a second geographical coverage area. When the mobile terminal moves from the first coverage area to the second coverage area, the connection is re-established through the RAN by way of the first and second RAN nodes using the temporary RAN identifier. The temporary RAN identifier employed in packets corresponding to the established connection is used to direct those packets to and from the first and second RAN nodes. The first and second RAN nodes analyze packets corresponding to the established connection using a temporary RAN identifier included in each packet. From that analysis of the temporary RAN identifier, the first and second RAN nodes determine where packets are to be routed.

In a preferred example embodiment, the temporary RAN identifier may include (1) a RAN node identifier (the serving RNC identity) corresponding to the first radio network controller (RNC) through which the connection was initially established and (2) a local mobile terminal identifier unique within this RNC. The RAN node identifier and the local mobile terminal identifier are both employed when making initial contact in a new geographical coverage area. Thereafter, only a local mobile terminal identifier, unique within the current controlling RNC, is employed in order to save radio resources. Once the established connection is terminated, use of the temporary RAN identifier is discontinued.

Additional information may be provided along with the temporary RAN identifier in intra-RAN messages. Such additional information may include area information that permits the first RNC to route a message for the mobile terminal to the specific drift RNC controlling the area in which the mobile terminal is currently located. Such area information might include a registration area or a registration area and an additional cell outside of that registration area. The additional information may also include radio condition information.

BRIEF DESCRIPTION OF THE DRAWINGS

The foregoing and other objects, features, and advantages of the invention will be apparent from the following description of preferred example embodiments as illustrated in the accompanying drawings in which reference characters refer to the same parts throughout the various views. The drawings are not necessarily to scale, emphasis instead being placed upon illustrating the principles of the invention.

FIG. 5 is a flowchart diagram illustrating another example embodiment of the present invention;

DETAILED DESCRIPTION OF THE DRAWINGS

In the following description, for purposes of explanation and not limitation, specific details are set forth, such as particular embodiments, data flows, signaling implementations, protocols, techniques, etc., in order to provide an understanding of the present invention. However, it will be apparent to one skilled in the art that the present invention may be practiced in other embodiments that depart from these specific details. In other instances, detailed descriptions of well-known methods, interfaces, devices, and signaling techniques are omitted so as not to obscure the description of the present invention with unnecessary detail.

Figure 1:
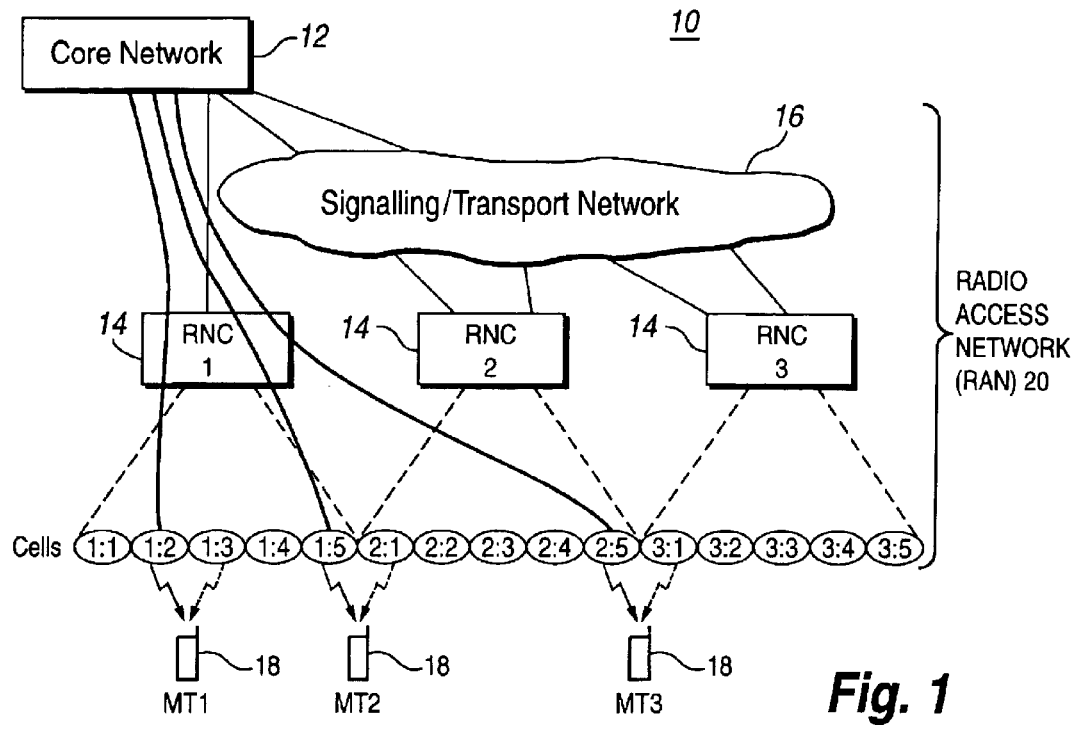
FIG. 1 is a function block diagram of a radio communications system in which an example embodiment of the present invention may be employed.
Figure 2:
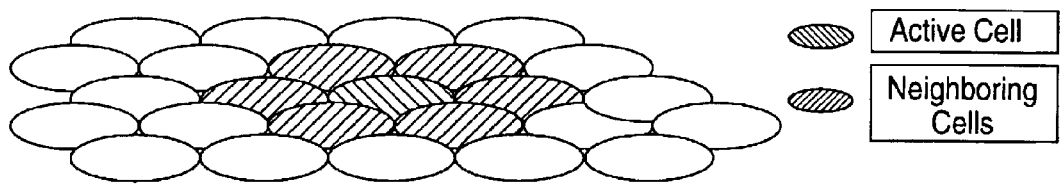
FIG. 2 is a diagram illustrating conceptually a cellular network identifying an active cell surrounded by neighboring cells.
Figure 3:
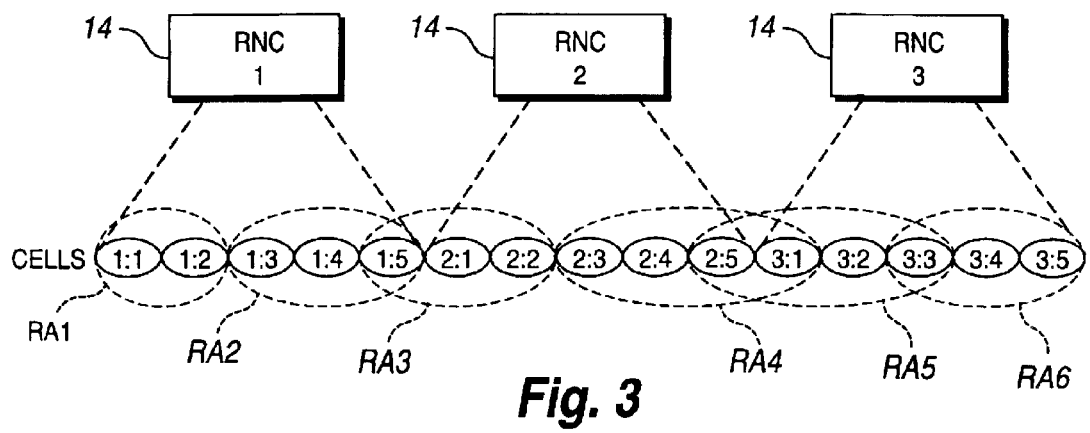
FIG. 3 illustrates a portion of the radio communications network shown in FIG. 1 and also illustrates the concept of registration areas.

The present invention may be implemented in the example cellular communications network illustrated in FIGS. 1–3 and described above. Of course, those skilled in the art will appreciate that the present application can be employed in other contexts as well.

Figure 4:
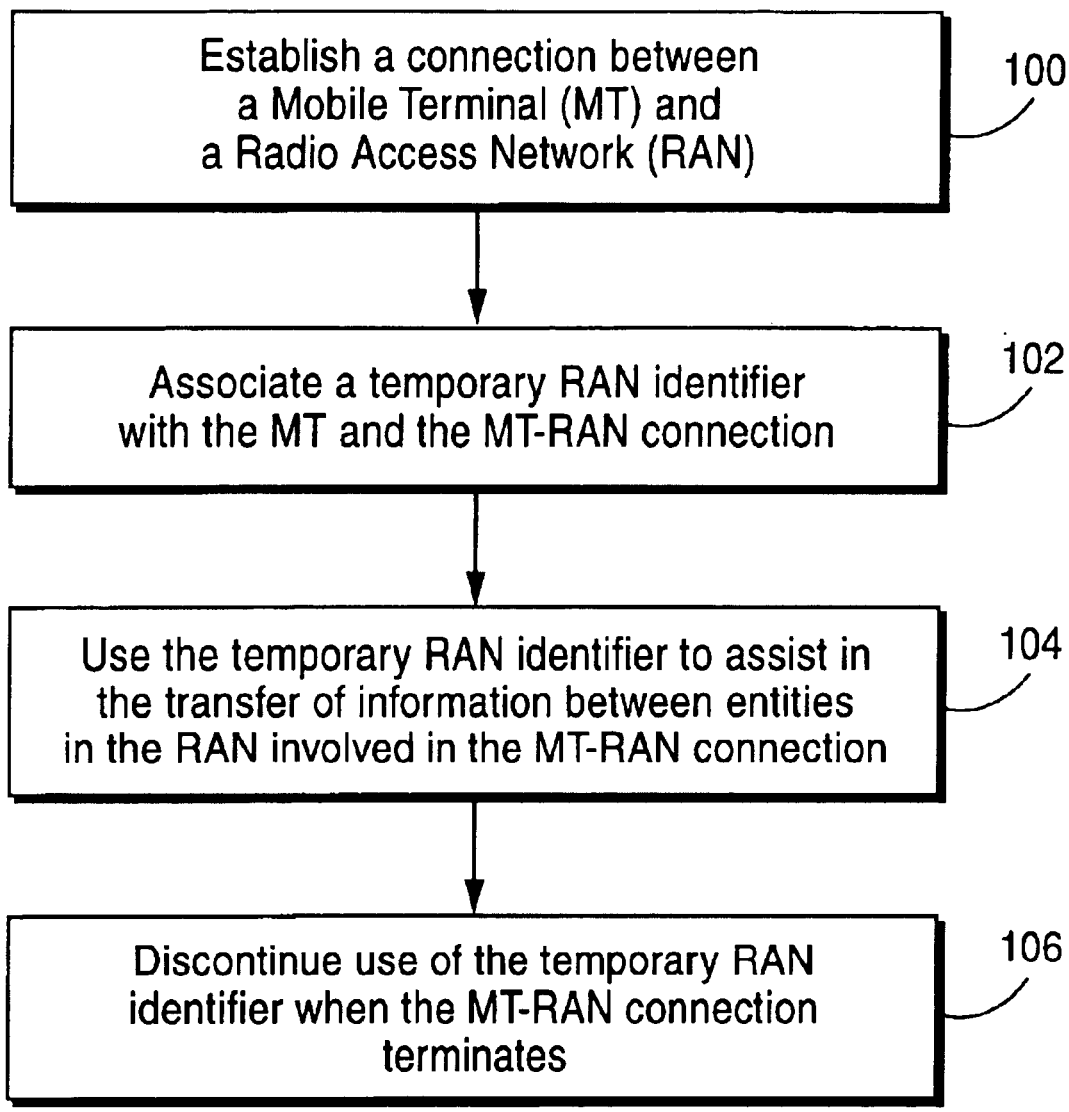
FIG. 4 is a flowchart diagram illustrating an example embodiment of the present invention.

FIG. 4 illustrates an example embodiment of the present invention.

Initially, a connection is to be established between a mobile terminal (MT) and a radio access network (RAN) (block 100). A temporary RAN identifier is associated by the RNC through which the connection is initially established, i.e., a serving RNC. That temporary RAN identifier is further associated with the mobile terminal, and as a result, identifies the specific RAN connection (block 102). The temporary RAN identifier is then used to assist in the transfer of information between entities in the RAN that are involved with the MT-RAN connection as well as between the MT and the RAN (block 104). This would include both information that is used in establishing the connection, in maintaining that connection, and in transferring that connection between different cells as the mobile terminal moves.

Use of the temporary RAN identifier is discontinued when the MT-RAN connection terminates.

FIG. 5 shows another more elaborate—but still example—embodiment of the present invention. An MT-RAN connection is established via a serving RNC (SRNC) (block 110) between the core network 20 and one of the mobile terminals 18. For purposes of illustration, the serving RNC corresponds to RNC1 in FIG. 1, assuming that RNC1 is the controlling RNC (CRNC) for the cell where the MT-RAN connection is established. The SRNC assigns a temporary RAN ID and a CRNC MT ID to the MT to identify the MT-RAN connection (block 112). Because the radio interface portion of the connection involves only the CRNC and the MT, only the CRNC MT ID need be used. Therefore, only the CRNC MT ID is inserted into control and user data packets transported over the radio interface associated with the MT-RAN connection (block 114). The temporary RAN ID consists of one part that identifies the SRNC (an SRNC identifier or address) and one part that identifies the mobile terminal within the SRNC (an SRNC MT identifier). The CRNC MT ID is typically shorter than the temporary RAN ID in order to minimize addressing information length over the radio interface. The use of two identifiers—SRNC MT ID and CRNC MT ID—is particularly beneficial in a later cell update procedure conducted at a cell controlled by another RNC. While the SRNC MT ID should preferably be allocated by the SNRC, the CRNC MT ID may be allocated by a DRNC to avoid collisions. When the CRNC controlling the cell of the MT is also the SRNC, the SRNC MT ID and the CRNC MT ID may be the same.

When the MT re-establishes the MT-RAN connection via a new cell controlled by the same RNC, now acting as the SRNC, the temporary RAN ID is used to effect the reestablishment (block 116) because the MT is not aware whether the new cell is controlled by the same or another RNC. The SRNC may optionally assign a new CRNC MT ID to the MT (block 118) to be inserted in each control and user data packet sent over the radio interface on the MT-RAN connection (block 120). Of course, the use of the same CRNC MT ID assigned in block 112 may also be continued.

When the MT re-establishes the MT-RAN connection via a new cell controlled by a new RNC, acting as the DRNC for the MT-RAN connection, the temporary RAN ID is again used to establish the connection in the new cell (block 122) because the MT is not aware that the new cell is controlled by another RNC. The DRNC assigns a new CRNC MT ID to the MT (block 124) to be inserted in each control and user data packet sent over the radio interface on the MT-RAN connection (block 126).

Optionally, if the MT-RAN connection is converted from a packet type connection to a dedicated type of connection through the RAN 20, the use of the temporary RAN ID for identification of packets in the radio interface is discontinued because the channel is then dedicated to just that connection (block 128). There is no longer a need to route/address packets. However, if the MT-RAN connection is later re-converted to a packet-type of connection, use of the previous temporary RAN ID may be resumed or a new temporary RAN ID be assigned by the SRNC. In any event, when the MT-RAN connection is terminated, use of the temporary RAN ID is discontinued (block 130).

Figure 6A:
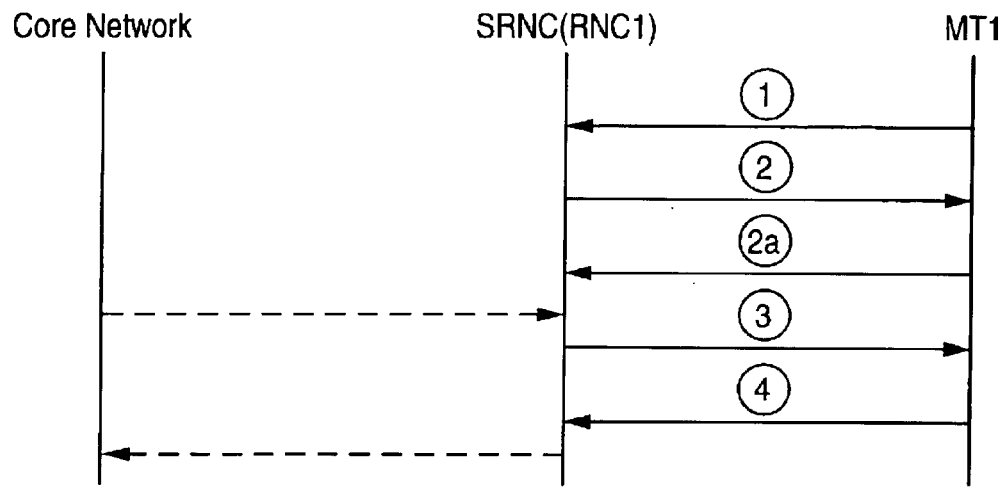
FIG. 6A is a signaling diagram showing example messages communicated between RAN entities in FIG. 1.
Figure 6B:
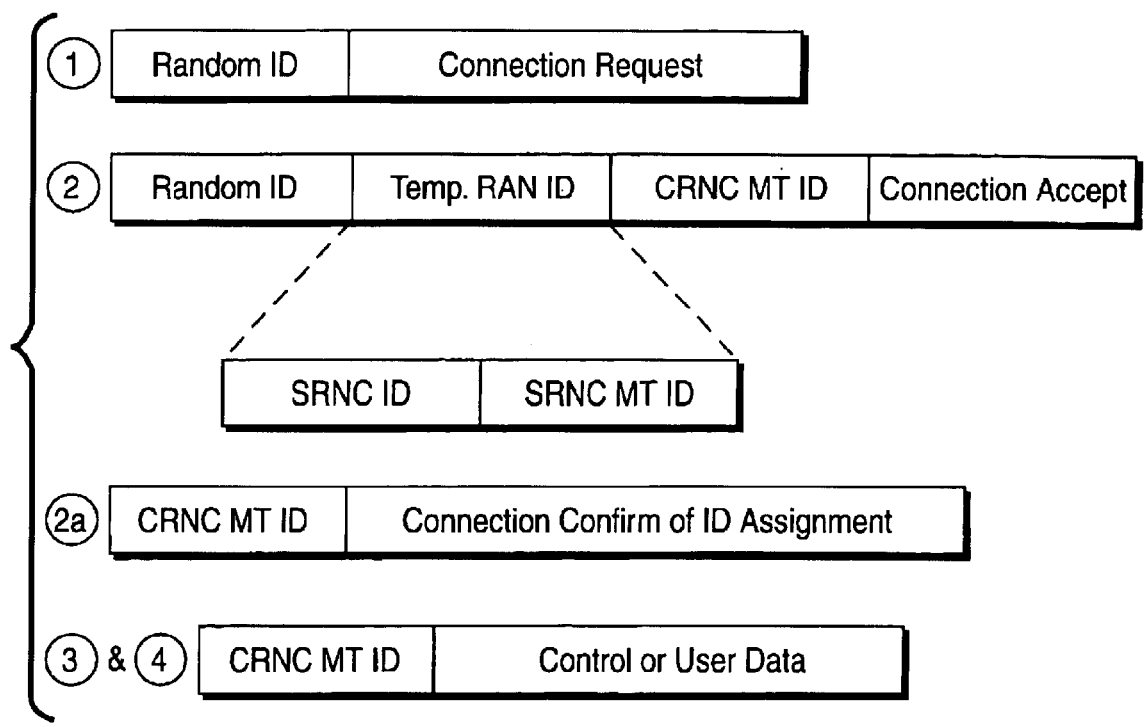
FIG. 6B illustrates example formats of the messages employed in FIG. 6A.

A specific example relating to establishing a MT-RAN connection is now described in conjunction with the cellular system 10 shown in FIGS. 1 and 3, the signal flow shown in FIG. 6A, and the packet formats shown in FIG. 6B. When the MT1 initially establishes a connection with the RNC1 by way of cell 1:2, the RNC1 acts as the serving RNC for that MT-RAN connection. The Connection Request message (1) is sent from MT1 to the SRNC as shown in FIG. 6B. Also included is, for example, a random ID (unrelated to the invention) used to avoid collisions in random access attempts over a random access channel. The SRNC then sends a Connection Accept message (2) to the MT1 which, as shown in FIG. 6B, includes a temporary RAN ID. Because this is an initial connection establishment request, the temporary RAN ID preferably includes in this example embodiment both an SRNC ID as well as a MT identifier recognized by the SRNC (i.e., an SRNC MT ID). Both IDs are used to establish routing through the RAN and to identify the MT-RAN connection when the MT moves outside the area covered by cells controlled by the SRNC, particularly when the connection is re-established in a cell not controlled by the SRNC. Because RNC1, now acting as SRNC for the MT-RAN connection, is also the CRNC for cell 2:1, the RNC1 also assigns a-CRNC ID to the MT (i.e., a CRNC MT ID). In this single RNC example, the SRNC MT ID could be adopted as the CRNC MT ID.

At this stage, control and user data messages can be exchanged between the MT and core network via the SRNC. Control messages might relate for example to authentication and service negotiation, the details of which are not relevant to the present invention. Example formats of control and user data messages transferred between the SRNC and MT are illustrated at messages (3) and (4) in FIG. 6B and employ only the CRNC MT ID.

The CRNC MT ID is preferably used as the address for messages (3) and (4) because it is shorter than the temporary RAN ID and therefore uses less radio resources. It is also used because the longer temporary RAN ID is not necessary after the routing path between the SRNC and MT is initially established by the message (2). However, the longer temporary RAN ID could be used as the address for messages (3) and (4). Once the RNC1 recognizes that it is the serving RNC, it functions as the direct interface to the core network and to the mobile terminal for that connection.

Figure 7A:
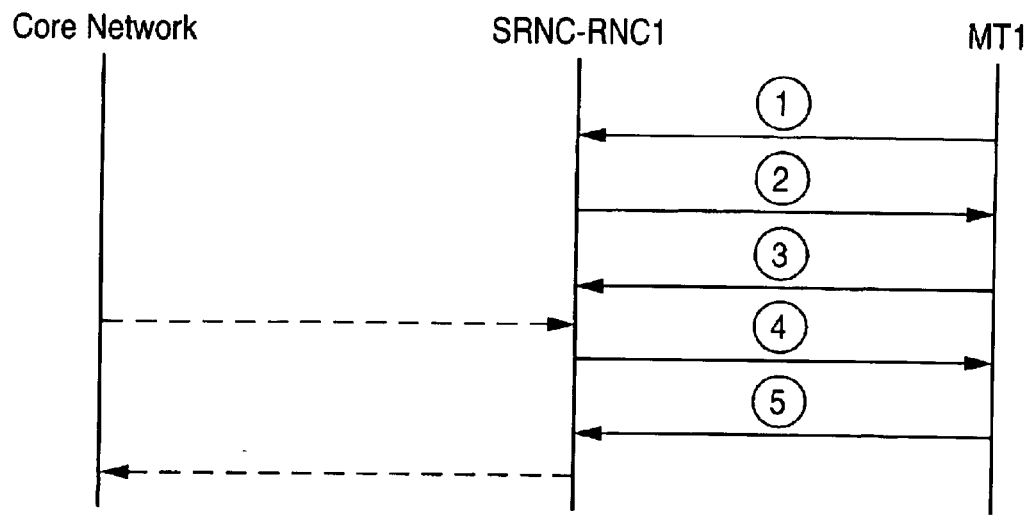
FIG. 7A is an example signaling flow diagram of a cell update procedure.
Figure 7B:
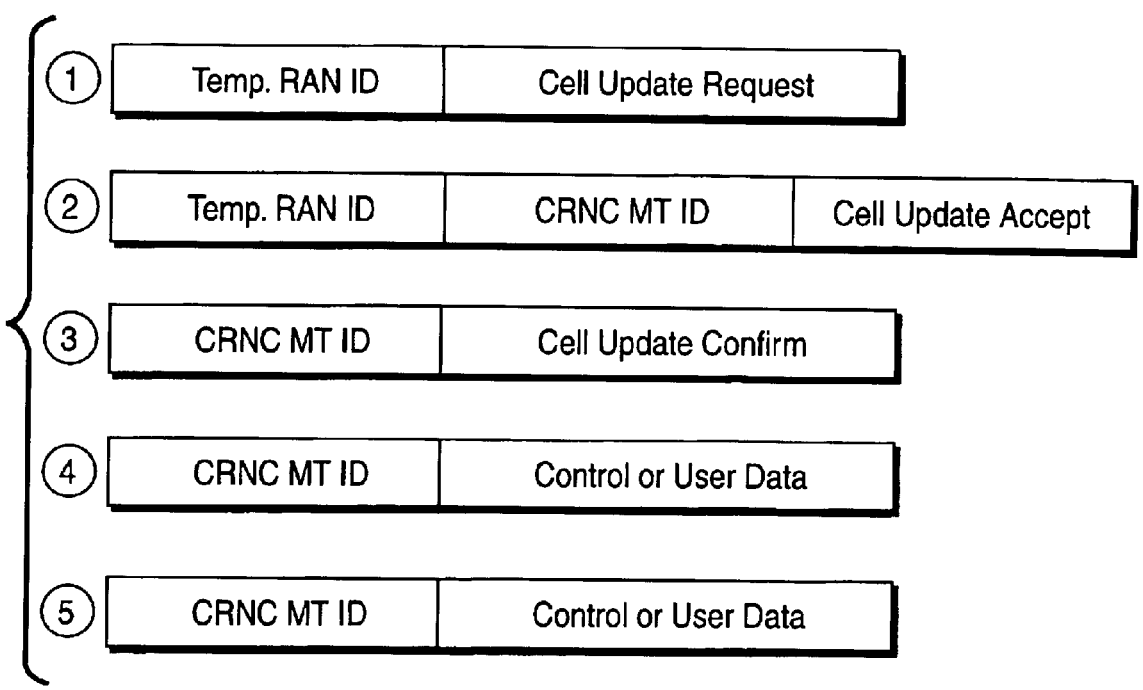
FIG. 7B illustrates example formats of messages shown in FIG. 7A.

FIGS. 7A and 7B illustrate a signaling diagram and example message formats, respectively, for a cell update procedure when the mobile terminal MT1 moves from cell 1:2 to cell 1:3. Having entered into a new cell, the mobile terminal MT1 must register in the new cell, and therefore, sends a Cell Update Request message (1) to the serving RNC (RNC1). The form of the Cell Update Request message (1) shown in FIG. 7B includes, in addition to the substantive message, the temporary RAN ID (including the SRNC ID and SRNC MT ID). The longer temporary RAN ID is needed because the MT does not know which RNC controls the cell where the MT performed the cell update. The SRNC then sends a Cell Update Message (2) to the mobile terminal having a format corresponding to that shown in FIG. 7B. Specifically, a new CRNC MT ID is assigned by the CRNC controlling the cell where the MT made the cell update. Alternatively, the SRNC MT ID assigned when the connection was initially established via cell 1:2 may also be employed as the CRNC MT ID since the RNC controlling the cell is the SRNC. Still further, the same CRNC MT ID assigned in a previous cell may be used. Information transfers using message formats (3)–(5) continue with preferably only the shorter CRNC MT ID included for addressing/routing with the control or user data in each packet.

Figure 8A:
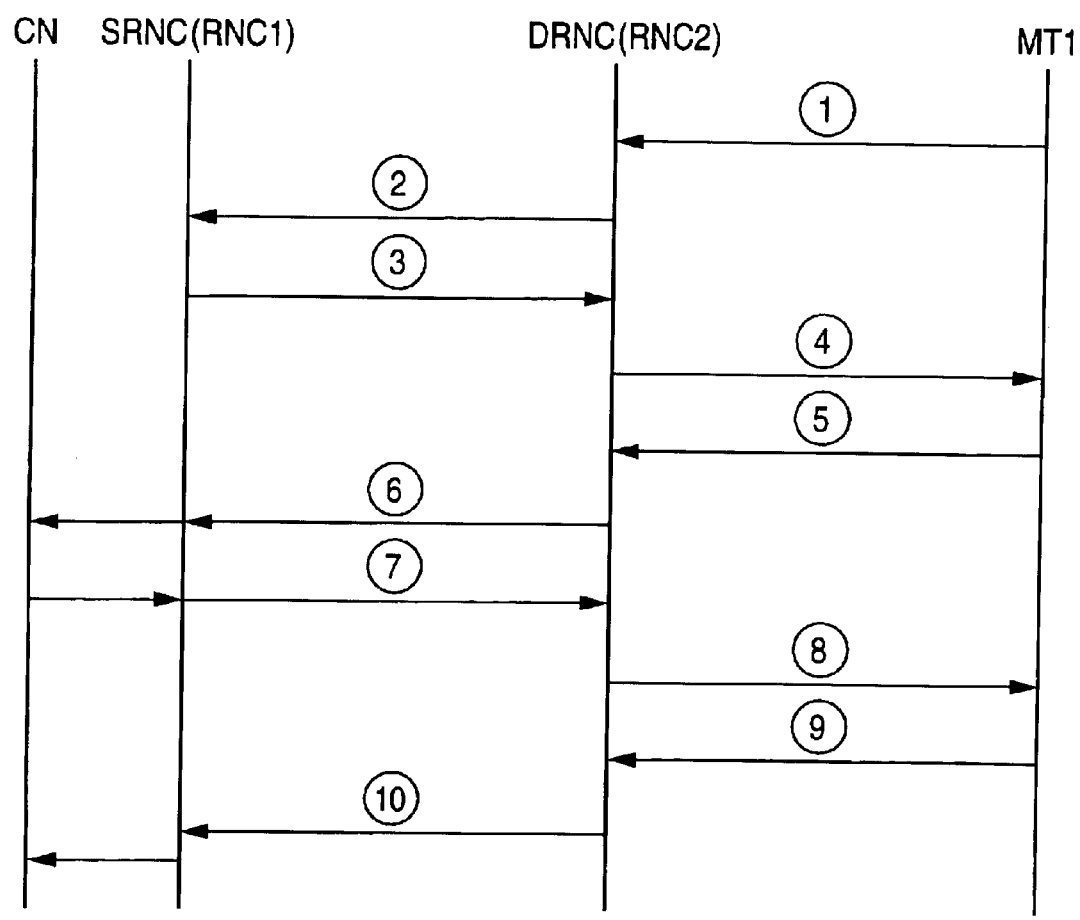
FIG. 8A is a signaling diagram of a cell update request that involves both a serving RNC and a drift RNC.
Figure 8B:
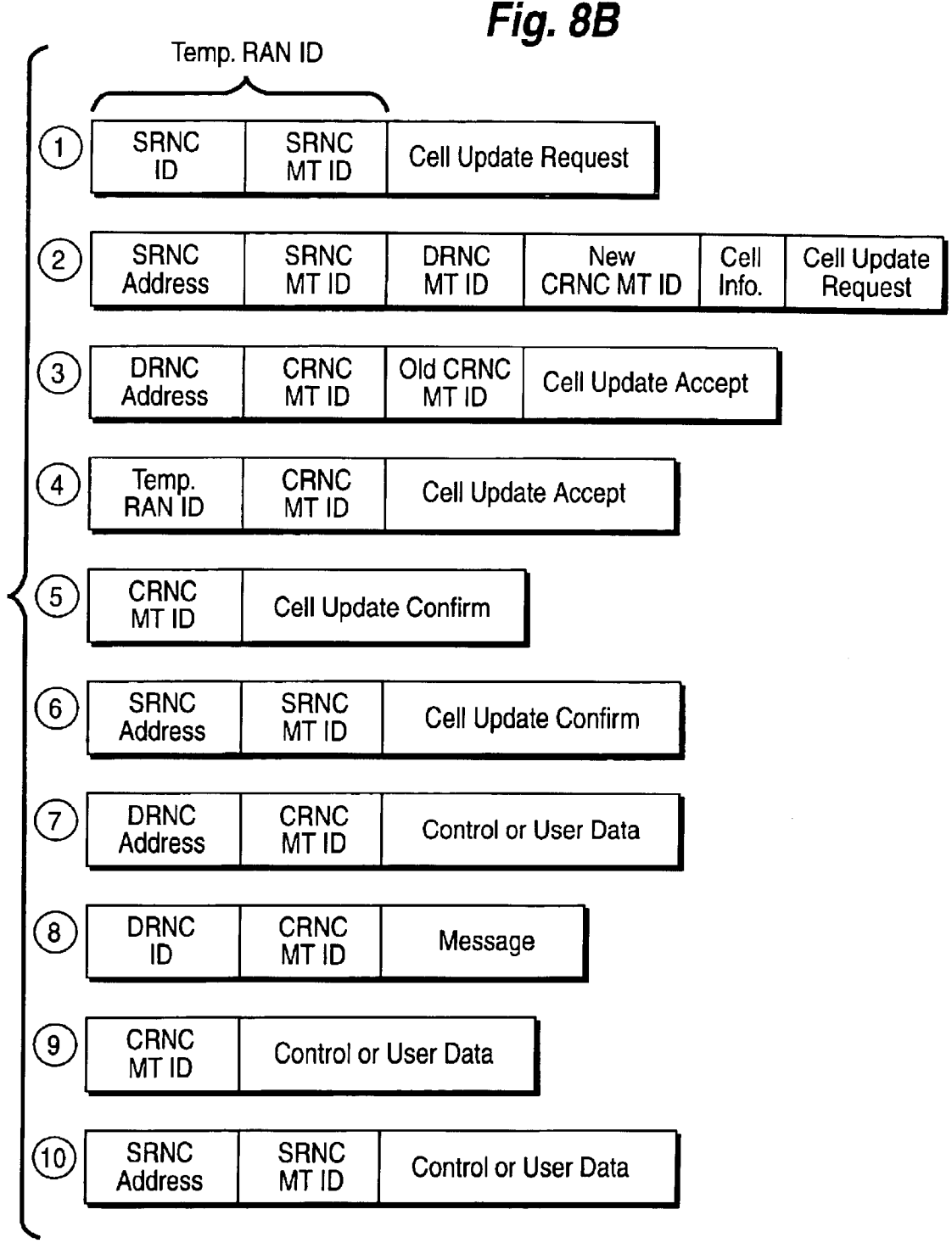
FIG. 8B shows example formats of messages employed in FIG. 8A.

A further example implementation of the present invention is now described in conjunction with FIGS. 8A and 8B which illustrate a signaling diagram and example message formats, respectively, for a more complicated cell update procedure. The mobile terminal MT1 moves from cell 1:5 and enters cell 2:1. Cell 2:1 is controlled by a new RNC (RNC2). The mobile terminal MT1 sends a Cell Update Request message (1) to the drift RNC (RNC2) using the message format shown in FIG. 8B at (1). The temporary RAN identifier (ID) accompanying the Cell Update Request includes both the SRNC ID and the SRNC MT ID address information. The drift RNC (DRNC) allocates a new CRNC MT ID. Using the SRNC ID included the temporary RAN ID, the drift RNC (RNC2) determines the SRNC address and forwards to the SRNC the Cell Update Request message along with the SRNC MT ID, the DRNC address, the DRNC ID, possibly a new CRNC MT ID, and new cell information (e.g., cell identification of the new cell so that the SRNC knows this information). The SRNC analyzes the Cell Update Request message (2) and employs the DRNC address and CRNC MT ID to route the Cell Update Accept message (3) back to the appropriate drift RNC (i.e., RNC2). Message 3 also contains the old CRNC MT ID (if any is allocated by this DRNC) in order to de-allocate this identification number with the DRNC. If a third RNC is involved, (e.g., the mobile terminal moves from a cell under the control of RNC2 to a cell under the control of RNC3), while the RNC1 is the serving RNC, a specific message may be employed to release the CRNC MT ID at the "old" drift RNC (RNC2).

The drift RNC sends a Cell Update Accept message (4) to the MT1 coupled with the temporary RAN ID (SRNC ID and SRNC MT ID) and the new CRNC MT ID to be used for subsequent data transfers within the same cell. The mobile terminal acknowledges the assignment of the CRNC MT ID by sending a "Cell Update Confirm" message (5) to the drift RNC. The drift RNC forwards this message to the serving RNC along with the SRNC address and the SRNC MT ID as shown at (6).

Subsequent data messages are passed between the MT1 and the core network (CN) by way of the drift RNC and the serving RNC in messages (7)–(10). In the direction from the MT1 to the SRNC, the message (7) is routed to the drift RNC where the mobile terminal is currently located. The DRNC ID is used as the RAN address of RNC2 or as a means to derive the RAN address of RNC2. The CRNC MT ID is used to identify the MT1 within the drift RNC (RNC2). The drift RNC forwards the message to the mobile terminal at (8) using the CRNC MT ID as the mobile terminal identifier. In the uplink direction towards the RAN, the mobile terminal uses the CRNC MT ID identifier in the message (9). The drift RNC forwards the message (10) to the serving RNC routing it through the RAN using the serving RNC ID as its RAN address or as a means to derive the RAN address of the serving RNC. The serving RNC MT ID is used to identify the mobile terminal by the serving RNC. The serving RNC also uses the SRNC MT ID to identify the corresponding user and forward the message to the core network.

Figure 9A:
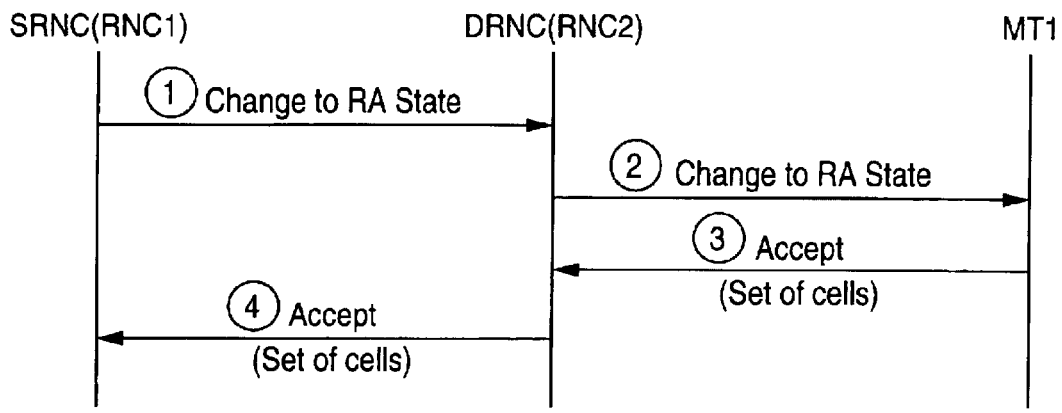
FIG. 9A is a Change of State signaling flow diagram.
Figure 9B:
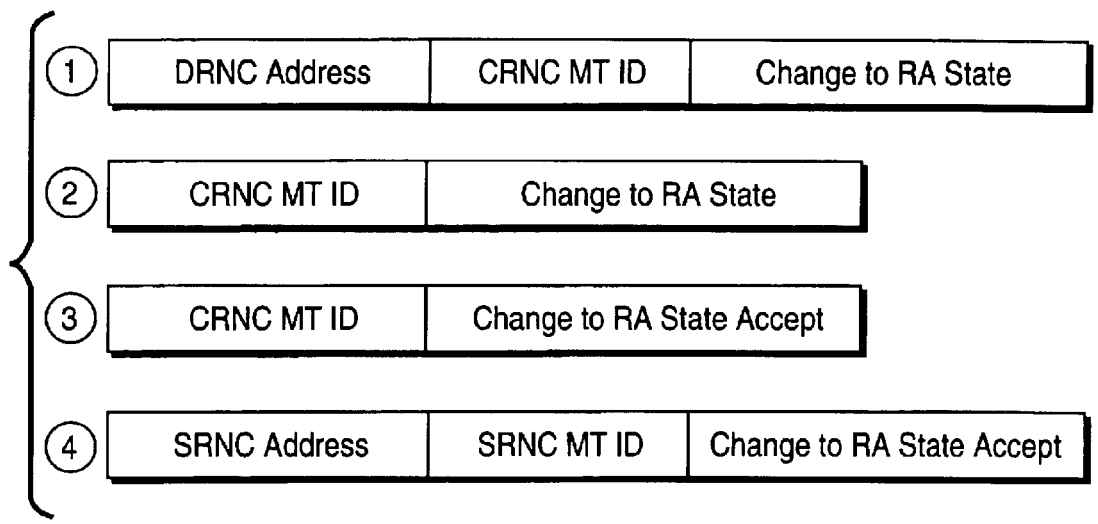
FIG. 9B shows example formats of messages employed in FIG. 9A.

Yet another example scenario where this more detailed example embodiment of the invention may be employed is described in conjunction with FIGS. 9A and 9B. At periods with very low traffic involving the mobile terminal, the SRNC may lower the activity level of the mobile terminal MT1 so that it needs only register/update with the RAN from its current location when passing a registration area border thereby conserving radio resources (see the example registration areas illustrated in FIG. 3). The SRNC decides to change the activity level of the mobile terminal MT1 to "RA state." The SRNC sends the message (1) "Change to RA State" to the drift RNC using the CRNC MT ID (as previously allocated by the drift RNC) to identify the mobile terminal MT1. This message may optionally contain cell information that specifies the area (in terms of cell and/or RA identities) where the mobile terminal MT1 may move without having to update its location. This area is referred to as the Individual Registration Area (IRA) for this MT. If not included in the message, the MT receives the valid registration area information from the broadcast channel of the cell. The drift RNC forwards the message to the mobile terminal using the CRNC MT ID as an address. The mobile terminal acknowledges the reception of the message by sending a "Change to RA State Accept" message to the drift RNC. Thereafter, the drift RNC forwards this message to the serving RNC using the SRNC address. The SRNC MT ID is used to identify the mobile terminal within the SRNC.

To avoid having to store information about all registration areas and the RNCs that control the cells of those registration areas in every RNC of the RAN, the SRNC may, prior to sending message (1) in FIG. 9B, selectively request this information from the drift RNC. The drift RNC selects the appropriate area for the mobile terminal, (in terms of registration areas and/or cells), and returns this information to the serving RNC together with the RNC identities and the RNC addresses of the RNCs that control the cells of that area.

Figure 10A:
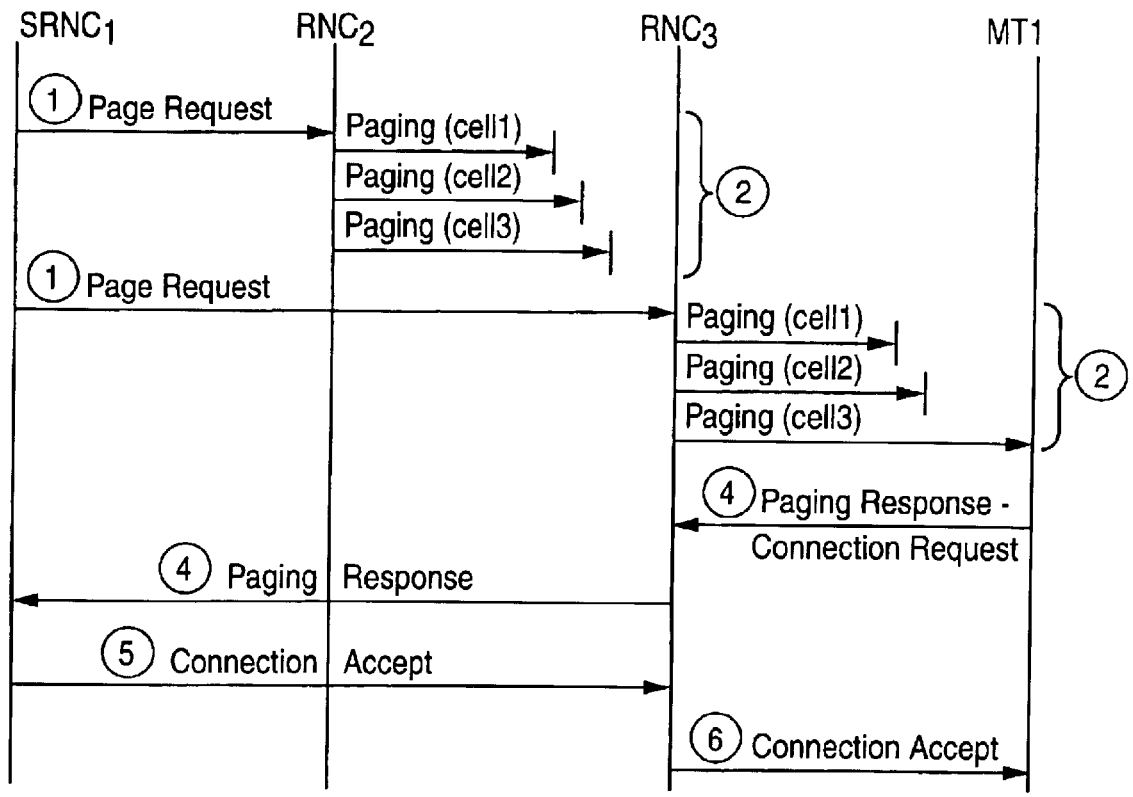
FIG. 10A is a signaling flow diagram of a paging operation.
Figure 10B:
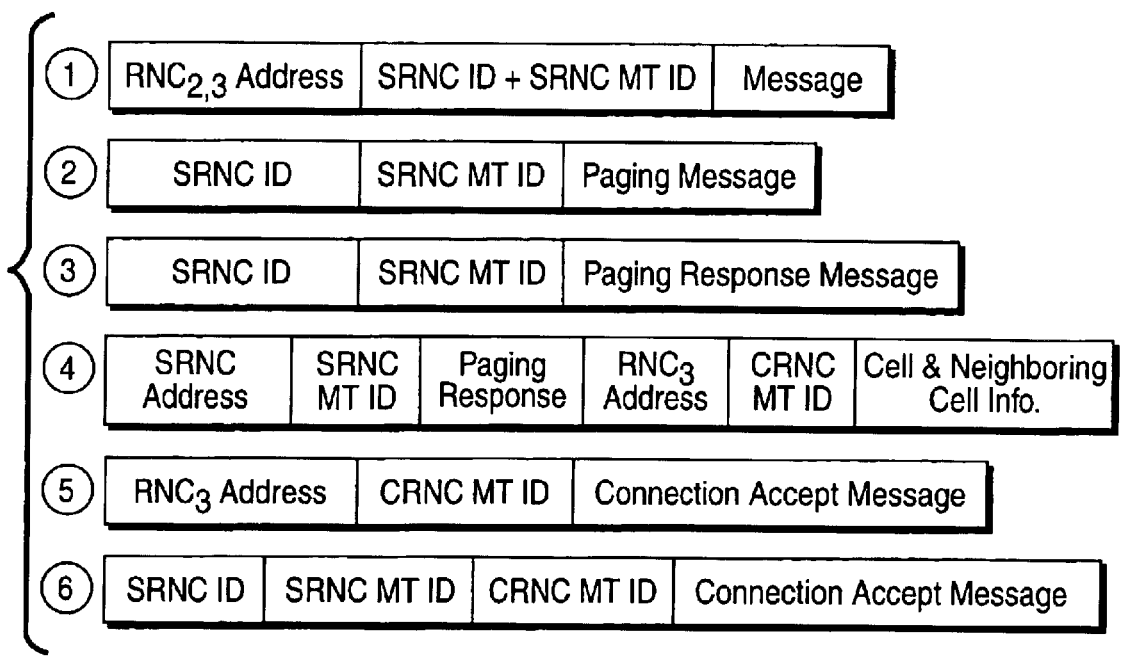
FIG. 10B illustrates example message formats of the messages employed in FIG. 10A.

Irrespective of the mobile terminal's activity level, the SRNC needs to be able to locate the idle mobile terminal at a cell level whenever there is data to be sent to that mobile terminal. The SRNC sends requests for paging to each RNC controlling cells of the IRA. FIGS. 10A and 10B illustrate an example paging procedure where this more detailed example embodiment of the invention may be employed. A paging request (1) is sent from the serving RNC (e.g. $RNC_1$) to other RNCs ($RNC_2$ and $RNC_3$) which control cells of the MT's IRA. As shown in FIG. 10B, the page request includes the address of one of the appropriate other RNCs ($RNC_2$ or $RNC_3$) along with the SRNC ID and the SRNC MT ID. Both of the other RNCs that receive the page request from the serving RNC send out paging messages (2) to each of the cells controlled by that RNC that also include the SRNC ID and the SRNC MT ID. These broadcast Paging messages (2) include the SRNC ID and the MT ID. The Paging Response (3) from the mobile terminal from one of the cells controlled by $RNC_3$ (in this example) is received. The drift RNC (corresponding to $RNC_3$) sends a Paging Response message (4) back to the serving RNC which includes the SRNC address, the SRNC MT ID, the paging response message itself, the drift $RNC_3$ address, the CRNC MT ID newly allocated by $RNC_3$, and cell and neighboring cell information. The serving RNC sends a Connection Accept message (5) to the drift RNC containing the $RNC_3$ address and the CRNC MT ID. The drift RNC ($RNC_3$) sends a Connection Accept message (5) back to the mobile terminal which includes the SRNC ID, the SRNC MT ID, the $RNC_2$ CRNC MT ID, along with the message. Accordingly, control and user data can be transported between the SRNC and the mobile terminal via the DRNC ($RNC_2$); using message formats similar to those shown in messages (7)–(10) in FIG. 8B.

The present invention provides for efficient and dynamic exchange of address/routing information between a mobile terminal and nodes (e.g., RNCs) in the radio access network. This is particularly advantageous when the mobile terminal re-establishes its connection with the radio access network using forward handover. The mobile terminal can re-establish the connection via a cell controlled by any RNC within the RAN, control messages can be routed between RNCs within the RAN in order to update the serving RNC with the current location (i.e., cell and controlling RNC) of the mobile terminal, and control and user data can be efficiently routed between the core network and the mobile terminal by way of the RAN. The efficient addressing and routing scheme of the invention is also advantageous when an idle mobile terminal communicates its current location or when the idle mobile terminal needs to be located.

While the present invention has been described with respect to a particular embodiment, those skilled in the art will recognize that the present invention is not limited to the specific embodiments described and illustrated herein. Different formats, embodiments, and adaptations besides those shown and described as well as many modifications, variations, and equivalent arrangements may also be used to implement the invention. Therefore, while the present invention has been described in relation to preferred example embodiments, it is to be understood that this disclosure is only illustrative and exemplary of the present invention.

What is claimed is:

1. In a radio communications system including a core network coupled to a radio access network (RAN) and a plurality of mobile terminals, a method for use after establishing a connection between the core network and one of a plurality of mobile terminals through the radio access network, comprising:

a RAN node associating a temporary RAN identifier with the mobile terminal for the connection; and using the temporary RAN identifier in the RAN to assist in the transfer of information through the radio access network relating to the connection.

2. The method in claim 1, wherein the temporary RAN identifier is used to route information between one or more entities in the RAN involved in the connection.

3. The method in claim 1, wherein the connection is a packet-based connection and the temporary RAN identifier is included in each connection packet, the method further comprising:

routing connection packets through the RAN using the temporary RAN identifier incorporated in each connection packet.

4. The method in claim 1, wherein the radio access network includes a first node associated with a first geographical coverage area and a second node associated with a second geographical coverage area, the method further comprising:

using the temporary RAN identifier in those packets corresponding to the connection to direct those packets to the first node.

5. The method in claim 4, wherein the mobile terminal moving from the first coverage area to the second coverage area reestablishes the connection using the temporary RAN identifier.

6. The method in claim 5, wherein the temporary RAN identifier includes a node identifier corresponding to the node through which the connection was initially established and a mobile terminal identifier.

7. The method in claim 6, wherein the node identifier corresponding to the node through which the connection was initially established and the mobile terminal identifier are employed when making initial contact in a new geographical coverage area.

8. The method in claim 7, wherein only the mobile terminal identifier is employed after making initial contact in the new geographical coverage area.

9. The method in claim 4, wherein the temporary RAN identifier includes a node identifier corresponding to the node through which the connection was initially established and a mobile terminal identifier, the method further comprising:

routing packets associated with the connection between the first and second nodes using a shortened temporary RAN identifier that lacks the node identifier.

10. The method in claim 4, wherein the first node is an initial RAN node that controls the connection from the perspective of the core network and the second node is another RAN node that currently serves the mobile terminal.

11. The method in claim 1, further comprising:

discontinuing use of the temporary RAN identifier when the established connection is terminated.

12. The method in claim 1, wherein the established connection is a packet-based connection, the method further comprising:

discontinuing use of the temporary RAN identifier when the established connection is allocated a dedicated radio channel.

13. In a radio communications system including a core network coupled to a radio access network (RAN) and a plurality of mobile terminals where a connection between the core network and one of a plurality of mobile terminals located in a first geographical area may be established through the radio access network, a method comprising:

associating a first RAN identifier with the one mobile terminal for the connection to be established;

using the first RAN identifier to assist in handling the connection in the radio access network when the one mobile terminal initially communicates with the radio access network from a second geographical area; and using a second RAN identifier to assist in handling the connection in the radio access network after the initial communication by the one mobile terminal from the second geographical area.

14. The method in claim 13, wherein the first and second RAN identifiers are temporary.

15. The method in claim 13, wherein the first RAN identifier is longer than the second RAN identifier.

16. The method in claim 13, wherein the first RAN identifier includes a node identifier corresponding to a RAN node through which the connection was initially established and a mobile terminal identifier.

17. The method in claim 16, wherein the second RAN identifier includes the mobile terminal identifier but not the node identifier.

18. The method in claim 13, wherein the radio access network includes plural RAN nodes and one of the RAN nodes determines a RAN node address using one of the first and second RAN identifiers.

19. In a radio communications system including a core network coupled to a radio access network (RAN) including a first Radio Network Controller (RNC) associated with a first area and a second Radio Network Controller (RNC) associated with a second area and a plurality of mobile terminals, where a connection maybe established between the core network and one of a plurality of mobile terminals located in the first area through the radio access network using the first RNC, a method comprising:

the first RNC associating a temporary RAN identifier with the one mobile terminal for the connection; and when the mobile terminal re-establishes the connection with the second RNC, the first RNC communicates information associated with the connection with the second RNC using the temporary RAN identifier.

20. The method in claim 19, wherein the temporary RAN identifier includes an RNC identifier corresponding to the first RNC through which the connection was initially established and a mobile terminal identifier.

21. The method in claim 19, wherein the temporary RNC identifier includes a RAN address of the first RNC.

22. The method in claim 19, further comprising:

determining an address of the first RNC using the temporary RNC identifier.

23. The method in claim 19, further comprising:

including additional RAN information in a message to the second RNC.

24. The method in claim 23, wherein the additional information includes area information that permits the first RNC to route a message for the mobile terminal to the RNC controlling the area that the mobile terminal is currently located.

25. The method in claim 23, wherein the additional information includes radio condition information.

26. The method in claim 19, wherein the temporary RAN identifier includes a first RNC ID and a first mobile terminal ID associated with the first RNC.

27. The method in claim 26, wherein after the connection is established with the first RNC, control or user data are sent between the mobile terminal and the first RNC using only the first mobile terminal ID.

28. The method in claim 19, further comprising:
analyzing at the second RNC a packet corresponding to the connection including the temporary RAN identifier included in the packet;
determining at the second RNC from the temporary RAN identifier that the packet is to be routed to the first RNC; and
routing the packet to the first RNC.

29. The method in claim 28, wherein the second RNC assigns a second mobile terminal ID to the mobile terminal, the method further comprising:
sending control or user data between the mobile terminal and the second RNC using only the second mobile terminal ID.

30. The method in claim 19, further comprising:
determining a RAN address of the first RNC using the temporary RAN identifier; and
using the determined RAN address of the first RNC in a subsequent message to be routed from the second RNC to the first RNC.

31. The method in claim 19, wherein when the connection is terminated, the method comprising:
using the temporary RAN identifier in association with another RAN identifier.

32. The method in claim 19, further comprising:
the first RNC determining another RAN identifier corresponding to the second RNC; and
the first RNC using the other RAN identifier to route a message associated with the connection to the second RNC.

33. The method in claim 32, further comprising:
assigning a second mobile terminal ID to the mobile terminal for this connection; and
employing the second mobile terminal ID to direct control or user data between the mobile terminal and the second RNC.

34. For use in a radio communications system including a core network coupled to a radio access network (RAN) and a plurality of mobile terminals, a RAN node comprising:
a memory having at least one region for storing computer executable program code; and
a processor for executing the program code stored in the memory,
wherein the program code includes code responsive to a request to communicate with or by one of the mobile terminals to establish a connection between the core network and the one mobile terminal through the radio access network and to associate a temporary RAN identifier for the connection; and code responsive to a message from the core network that uses the temporary RAN identifier to assist in a transfer of information in the radio access network.

35. The RAN node in claim 34, wherein the code is responsive to a page message from the core network to use the temporary RAN identifier to assist in a page of the mobile terminal.

36. The RAN node in claim 34, wherein the code is responsive to a cell update message from the mobile terminal including the temporary RAN identifier to assist in a cell update operation relating to the mobile terminal.

37. The RAN node in claim 34, wherein the code is responsive to a registration area update message from the mobile terminal including the temporary RAN identifier to assist in a registration area update operation relating to the mobile terminal.

38. The RAN node in claim 34, wherein the code is responsive to a forward handover message from the mobile terminal including the temporary RAN identifier to assist in a forward handover operation.

39. The RAN node in claim 34, wherein the code is responsive to a message from another RAN node involved in the connection to determine a RAN address of the other RAN node.

40. For use in a radio communications system including a core network coupled to a radio access network (RAN) and a plurality of mobile terminals, where a connection may be established between the core network and one of a plurality of mobile terminals through the radio access network, apparatus comprising:
means in the RAN for associating a temporary RAN identifier with the mobile terminal for the established connection; and
means in the RAN for using the temporary RAN identifier in the RAN to assist in the transfer of information through the radio access network.

41. The apparatus in claim 40, wherein the means for using uses the temporary RAN identifier to transfer information between one or more entities in the RAN involved in the established connection.

42. The apparatus in claim 40, wherein connection is a packet-based connection and the temporary RAN identifier is included in each connection packet, the apparatus further comprising:
means for routing connection packets through the RAN using the temporary RAN identifier incorporated in each connection packet.

43. The apparatus in claim 42, wherein the temporary RAN identifier includes a node identifier corresponding to the node through which the connection was initially established, the apparatus further comprising:
means for routing packets associated with the connection between the first and second nodes using a shortened temporary RAN identifier that lacks the node identifier.

44. The apparatus in claim 40, wherein the radio access network includes a first node associated with a first geographical coverage area and a second node associated with a second geographical coverage area, the apparatus further comprising:
means for using the temporary identifier in packets corresponding to the established connection to direct those packets to the first node.

45. The apparatus in claim 44, wherein the mobile terminal moving from the first coverage area to the second coverage area re-establishes the connection using the temporary RAN identifier.

46. The apparatus in claim 45, wherein the temporary RAN identifier includes a node identifier corresponding to the node through which the connection was initially established and a mobile terminal identifier.

47. The apparatus in claim 46, wherein the mobile terminal may employ the node identifier corresponding to the node through which the connection was initially established and the mobile terminal identifier when making initial contact in a new geographical coverage area.

48. The apparatus in claim 47, wherein only the mobile terminal may employ only the mobile terminal identifier after making initial contact in the new geographical coverage area.

49. The apparatus in claim 44, wherein the first node is an initial RAN node that controls the connection from the perspective of the core network and the second node is another RAN node that currently serves the mobile terminal.

50. In a radio communications system including a core network coupled to a radio access network (RAN) including a first Radio Network Controller (RNC) associated with a first area and a second Radio Network Controller (RNC) associated with a second area and a plurality of mobile terminals, where a connection may be established between the core network and one of a plurality of mobile terminals located in the first area through the radio access network using the first RNC, a method comprising:

the first RNC assigning a temporary RAN identifier and a first RNC mobile terminal identifier (MT ID) to the one mobile terminal for the connection;

sending control or user data between the mobile terminal and the first RNC using the first RNC MT ID;

if the mobile terminal re-establishes the connection with the second RNC, the first RNC communicates information associated with the connection with the second RNC using the temporary RAN identifier;

the second RNC assigning a second RNC MT ID to the mobile terminal; and sending control-or user data between the mobile terminal and the first and second RNCs using the second RNC MT ID.

51. The method in claim 50, further comprising:

the first RNC sending a page request to the second RNC containing a first RNC identifier and the first RNC MT ID; and the second RNC paging the mobile terminal and the mobile terminal responding to the page using the first RNC identifier and the first RNC MT ID.

52. The method in claim 51, further comprising:

the second RNC forwarding the page response to the first RNC along with the first RNC MT ID and the second RNC MT ID.

* * * * *